June 18, 1940.  E. H. KLEMMER  2,205,206
DIFFERENTIAL PROTECTIVE SCHEME
Filed June 14, 1938  3 Sheets-Sheet 2

WITNESSES:

INVENTOR
Edward H. Klemmer.
BY
ATTORNEY

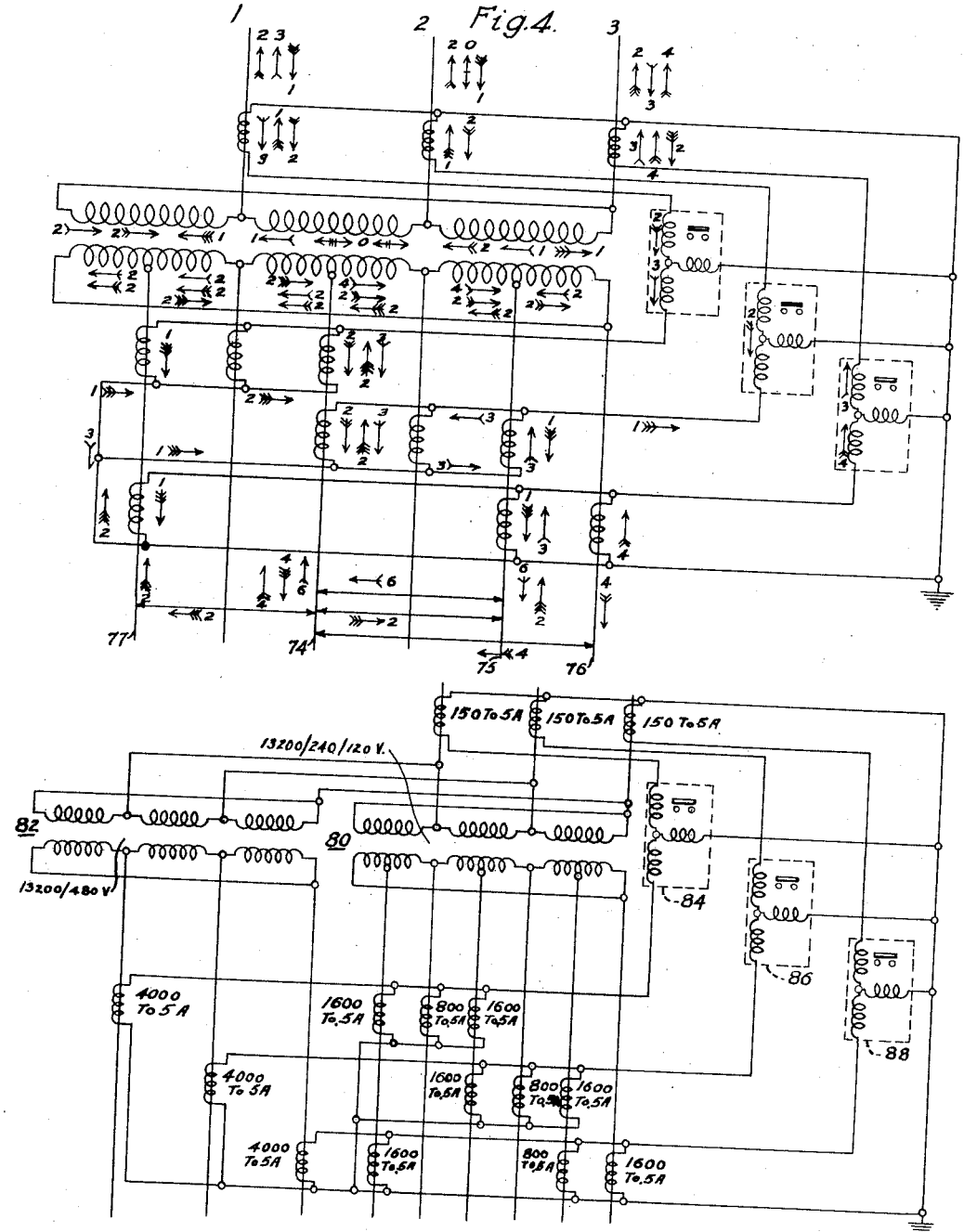

Patented June 18, 1940

2,205,206

UNITED STATES PATENT OFFICE 2,205,206

DIFFERENTIAL PROTECTIVE SCHEME

Edward H. Klemmer, Wilkinsburg, Pa., assignor to Westinghouse Electric & Manufacturing Company, East Pittsburgh, Pa., a corporation of Pennsylvania Application June 14, 1938, Serial No. 213,649

18 Claims. (Cl. 175—294)

In the modern tendency to large units of apparatus it is frequently desirable to protect an electric machine against internal faults, and precautions are frequently taken to protect the unit against complete destruction due to the effect of a fault or failure within the unit itself. If the protective mechanism provided does not disconnect the power lines from the unit of apparatus or machine substantially immediately upon the development of an internal fault, and particularly an internal short, the machine may be damaged to so great an extent as to be beyond economical repair. Where the machine is part of an extensive electrical network, the usual protective means operable by faults in the system may have its disconnecting means, which remove the power from the machine, operable at too great a time after the occurrence of the fault fully to protect the machine against excessive damage resulting from the internal faults on the machine. Primarily for these reasons, machines have been protected for internal faults by a system known as a differential protective system.

The differential protective system for a machine consists of balancing the in-going and out-going currents of the machine due to the load or external faults against each other, and is usually accomplished by connecting a current transformer at ends of the phase-windings, connecting their secondaries in series, and connecting the operating coil of a relay across the secondaries. As long as the secondary currents are balanced, no current will flow through the operating coil of the relay as the currents will be balanced under all conditions of load, normal or abnormal. However, any internal leakage of current due to a fault, or short circuited turns in the machine may upset the aforesaid balance and send differential current through the coil of the relay. This operates the relay to trip the necessary circuit breakers which disconnect the faulty apparatus from the power supply. Such a system is not responsive to external faults because of the balancing of the load currents in the secondaries of the current transformers. The differential relay may be of relatively high speed operation and responsive to the internal fault conditions substantially immediately. The machine, therefore, can be isolated from the system before appreciable damage or shock results from the fault.

It is a general object of my invention to provide a protective system for internal faults in a phase winding of an alternating-current machine having two different voltage supplies.

It is a further object of my invention to provide a protective system for internal faults in a transformer having one winding with two different voltage supplies.

It is another object of my invention to provide a protective system for internal faults in a transformer, which transformer delivers current from at least two phase windings, the windings themselves having additional tapped feeders.

It is a main object my invention to provide a protective system for internal faults in a multiphase alternating-current machine which is mesh-connected and has two different voltage supplies.

It is an object of my invention to show a general means for differentially protecting transformers against internal faults, and which can be applied to single phase transformers, multiphase transformers connected in star, mesh, zig-zag or combinations thereof, and, in fact, to any transformer employed solely to change a supply voltage to more than one value of feeder voltages or the converse.

It is a more particular object of my invention to provide a differential protective system for internal faults in a transformer having delta-connected primary or secondary windings, each winding of which has a fractional voltage tap for loads requiring the fractional voltage to be supplied simultaneously with the higher voltage load.

It is a specific object of my invention to provide a differential protective system to a three-phase transformer having a delta-connected primary and delta-connected secondary, the secondary windings of which have full voltage leads and half-voltage taps for simultaneuosly supplying loads requiring corresponding voltages.

Other objects and novel features of my invention will be apparent from the following description of the principles underlying my invention and in the drawings of which:

Fig. 4 illustrates the system of Fig. 3 under representative conditions of short circuit between combinations of various load leads of the secondary, and which shows generally that the differential relays do not operate in response to external faults; and Fig. 5 shows a practical application of the principle of my invention.

Generally stated, I have found that to protect a transformer with tapped and main load voltage supplies against internal faults by a differential system, the ratio of the current transformer in the tapped lead must have a definite relationship to the ratio of the main and tapped voltages of the secondary. Moreover, when the fault current has more than one possible path through the machine, then the effect of each path must be considered and current transformers additionally supplied in the tapped lead to render the differential system neutral under all load conditions, normal or abnormal. The additional current transformers also bear a definite relation to ratio of the tapped turns of the main transformer.

Figure 1:
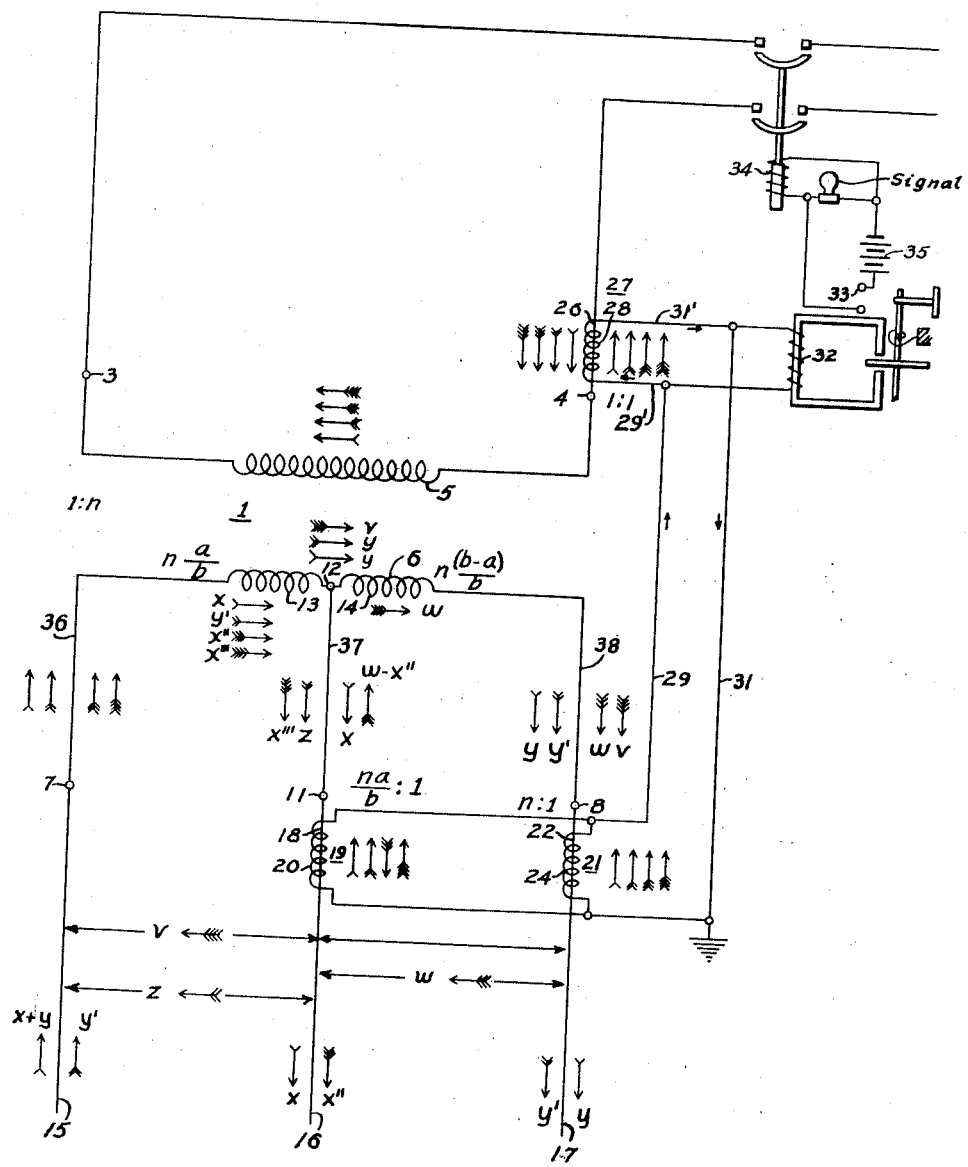
Figure 1 shows a single-phase transformer having a tapped secondary and a differential protective scheme applied therefor. This figure is utilized to describe some of the general principles underlying my invention.

Referring more particularly to Figure 1, I have shown the main transformer 1 having a general ratio of relative primary turns to secondary turns of $1:n$, and all transformer ratios including those of the current transformers are similarly expressed in the description of this figure to avoid confusion. Between terminals 3 and 4 is connected the primary winding 5, and the secondary winding 6 is connected between terminals 7 and 8. A terminal 11 connects to a tap point 12 on the secondary winding. The tap point 12 divides the secondary winding 6 into two fractional windings 13 and 14, respectively. The number of turns on the winding 13 may be assumed to be some fraction $$\frac{a}{b}$$

of the total number of turns of the secondary. Expressed in the ratio of the transformer, the relative number of turns in the winding 13 is obviously $$n\frac{a}{b}$$

It necessarily follows that the relative number of turns on the other section 14 of the transformer will be $$n\left(1-\frac{a}{b}\right)$$

or $$n\frac{(b-a)}{b}$$

Load leads or buses 15, 16 and 17 extend from the terminals 7, 11 and 8, respectively, and, correspondingly, power leads connect to the terminals 3 and 4 of the primary.

The primary of a current transformer 19 having windings 18 and 20 is connected in the tapped load lead 16; a current transformer 21 having windings 22 and 24 has the former winding connected in the load lead 17; and a primary side current transformer 27 having windings 26 and 28 has the former winding connected in one of the power leads, and is shown in Fig. 1 as connected to the lead extending to the terminal 4. For purposes of representing the principles of my invention, the transformer 27 may be deemed to have a ratio of $1:1$, the transformer 21 may be deemed to have a ratio of $n:1$, and the transformer 19 may be deemed to have the ratio $$n\frac{a}{b}:1$$

The transformers 19 and 21 have their secondaries connected in parallel and this parallel circuit is in series with the secondary 28 of the primary side current transformer 27, the series connections being shown by the leads or conductors 29, 29', 31 and 31'. Across these leads is a differential relay 32 having contactor 33 for closing, when operated, a circuit to the necessary trippers, indicated for simplicity as a circuit breaker trip coil 34, and a signal. A source of power for the circuit is obviously essential, and has been here indicated as a battery 35, although any other convenient source may be employed.

Inasmuch as Fig. 1 is employed primarily to show some of the general principles underlying my invention, the various transformers are assumed to be ideal; that is, the ratios of transformation are constant for all elements and under all conditions, and depend entirely on the relative number of turns in the coupled windings.

As is well known in the art, the differential relay 32 will not operate when the currents, as shown by the arrows having no feather attached, flowing in the conductors 29 and 29' are equal; and the currents flowing in the conductors 31 and 31' are equal. Obviously by Kirchoff's laws, no current can then flow through the operating coil of the relay 32. However, if the currents in the conductors 29 and 29'; or 30 and 31' are not equal then the unbalance current must flow in the relay 32; the relay will operate and the circuit breaker and signal will correspondingly be operated.

In the following analysis, it must be remembered that the common expedients well known to the art can be applied to modify the circuits and transformer ratios shown in Fig. 1. For example, the different current transformers may have the ratio of either of their sides multiplied by a constant. Thus, assuming that the secondary turns are to be multiplied by the constant $n$, the ratio of the transformer 27 becomes $1:n$, the ratio of the transformer 19 becomes $$\frac{a}{b}:1$$

and the ratio of the transformer 21 becomes $1:1$. Correspondingly, while I have indicated all ratios with respect to unity, both sides of the ratios may be multiplied by corresponding constants without altering the relative ratios, as is well known. Where $n$ of Fig. 1 is greater than 1 the main transformer is the step-up transformer, and where $n$ is less than 1, then obviously the main transformer is the step-down transformer. I merely state these general principles, which are well known to the art, to indicate that any particular analysis may yield the same results with different ratios of transformation between the windings of the various transformers, so long as there is a common relative base for them.

The following analysis indicates that the currents in the relay circuit conductors are balanced for different types of external faults, when the transformer ratio in the tapped voltage supply corresponds with the fraction of tapped secondary turns to the main secondary turns. In this analysis, the fundamental transformer equation that $I_1N_1 = I_2N_2$, (that is, the ampere turns of primary and secondary are equal) is utilized to determine the various values of current in the different circuits. The different feathered arrows indicate the flow of current under the different conditions; for example, the single feathered arrows show the direction of current components in the particular branches for the normal current in the load leads 15, 16 and 17. The double feathered arrows indicate the direction of flow of current components in the various branches due to a short of $z$ units across the load leads 15 and 16. The triple and quadruple feathered arrows correspondingly show the direction of current components in the various branches due to a short of $w$ units in leads 16 and 17, and of $v$ units across load leads 15 and 17, respectively.

It is, of course, understood that the relay system in common with similar systems, is adjusted for practical operation so that it will not be operated by the exciting current for the transformer 7 and which would be the only current when the secondary is completely open. The common expedients to prevent operation of the relay system by transient conditions of practically instantaneous occurrence under switching operations or the like are also incorporated in the relay system.

CASE 1.—*Normal conditions—single feathered arrows*

If it is assumed that $x$ units of current flow in load bus or lead 16 and $y$ units in 17, then $x+y$ units flow in load lead 15. The single feathered arrows show the assumed direction of flow of current in the different elements of the system, the direction of the current in the coupled windings of the transformers being in opposite phase, as is well known.

The through currents in the load leads may be deemed to flow unchanged through the transformer leads or conductors 36, 37 and 38, and as flowing through the secondaries of the power transformer 1 with components of $y$ units in entire winding 6 and $x$ units in winding 13; or as is actually the case $y$ units in winding 14, and $x+y$ units in winding 13. In determining the values of current in the different branches the ultimate result will be the same whichever set of values is taken. For purposes of analysis, the former set of values is employed, inasmuch as this set lends itself to rapid computations.

Assuming then that $y$ units flow in windings 6 and $x$ units in winding 13, the currents through the various elements can be completed from the fundamental transformer equations to be as follows:

I.  Current in winding $20 = x\frac{na}{b}$

II. Current in winding $24 = yn$

III. Since these currents are in the same direction, their sum flows in circuit 29–31, and is $$x\frac{na}{b}+yn$$

IV. Component of current in winding 5 and, therefore, also in winding 28 due to current $y$ in winding $6 = yn$.

V. Component of current in winding 5 and, therefore, also in winding 28 due to current $x$ in winding $13 =$ $$x\frac{na}{b}$$

VI. Total current in circuit 29'—31' due to that in winding 28 is $$yn + x\frac{na}{b}$$

The current in the relay circuit due to the primary side current transformer is equal to and in the same direction as the current due to the secondary side current transformers. Therefore, the differential protective relay 32 will not operate under normal load conditions.

CASE 2.—*Open circuit in load leads* 15, 16 *or* 17

An open circuit in lead 16 amounts to making $x$ of Case 1 equal to zero so that the fundamental balance of the relay circuit is not disturbed as may be seen from inspection of Equations III and VI. In the same way an open circuit in lead 17 amounts to making $y$ of Case 1 equal to zero with no disturbance of the balance of the currents in the relay circuit. An open circuit in lead 15 amounts to making $x$ equal to minus $y$ or both $x$ and $y$ numerically equal to zero, depending on whether or not there is a load across 16 and 17, with no disturbance of balance in the relay system. If the tapped supply had been between leads 16 and 17, an open circuit in lead 15 will not affect the flow of current to any load feed by the tapped supply. In such instance, $y$ may be deemed equal to $m$, the load current, and $x = -m$, assuming the single feathered arrows as in Case 1. It should be noted that $x$ is negative, indicating that the direction of the single feathered arrow $x$ should be reversed. These values of $x$ and $y$ substituted in Equations III and VI do not disturb their fundamental balance.

Accordingly, the differential protective relay will not operate for any external open circuit in the secondary leads regardless of how the loads are connected between them.

CASE 3.—*Short or open circuits in external primary leads*

Assuming no power source on the secondary side, the short merely reduces the voltage and current in the primary and the secondary windings by proportion amounts. If the short is complete, then no voltage at all is across the primary winding, and therefore, none across the secondary. All values of current become zero. The same is true for on open circuit in the primary external leads.

If there be a minor power source on the secondary side then in case of a short the transformer merely reverses and the equivalent of Case 1 occurs.

CASE 4—*Short of* "z" *units between load leads* 15 *and* 16—*double feathered arrows*

If a short of $z$ units is assumed between leads 15 and 16, as shown, the currents in the transformer may be deemed to have components $y'$ units in bus 38 and in winding 6
$z$ units in bus 37 and in winding 13
$z+y'$ units in bus 36.

This then is Case 1 with $x$ equal to $z$, and $y$ equal to $y'$. The equality of Equations III and VI is not altered by such substitutions for $x$ and $y$. Accordingly, the protective relay does not operate due to the assumed external fault.

CASE 5.—*Short of* "w" *units between load leads* 16 *and* 17 *triple feathered arrows*

If a short of $w$ units is assumed between leads 17 and 16, as shown, the currents in the transformer may be deemed to have components $w$ units in bus 38 and winding 14
$x''$ units in bus 36 and winding 13
$w-x''$ units in bus 37.

VII. Current in winding 20=

$$(w-x'')\frac{na}{b}$$

VIII. Current in winding 24 = $wn$.

IX. Since these currents are in opposed directions, the current that flows in circuit 29–31 is $$wn-(w-x'')n\frac{a}{b}=wn\frac{(b-a)}{b}+x''\frac{na}{b}$$

X. Component of current in winding 5 and, therefore, in winding 28 due to that in winding 14=

$$wn\frac{(b-a)}{b}$$

XI. Component of current in winding 5 and, therefore, in winding 28 due to that in winding 13=

$$x''n\frac{a}{b}$$

XII. The currents X and XI are in the same direction and the sum of both flows in circuit 29'—21', and is $$wn\frac{(b-a)}{b}+x''n\frac{a}{b}$$

Inasmuch as IX and XII are equal and in the same direction in the circuit 29—31, the differential protective relay will not operate with an external short across the load leads 35 and 37.

CASE 6.—*Short of "v" units between load leads 15 and 17 quadruple feathered arrows*

If a short of $v$ units is assumed between leads 15 and 17, as shown, the currents in the transformer may be deemed to have components $v$ units in bus 38 and winding 14
$x'''$ units in bus 37 and winding 13
$v+x'''$ units in bus 36.

Case 6 then as a particular instance of Case 1 wherein $x=x'''$ and $y=v$. The equality of Equations III and VI is not altered by the new values. Accordingly, the protective relay does not operate due to this assumed fault.

It may thus be seen that any type of external fault will cause no operation of the relay 17. However, a fault within the transformer will change the ratio of transformation. For example, if a number of turns of the primary 5 or of the fractional windings 13 and 14 are shorted, the transformation of voltage and current in the main transformer no longer corresponds to its ratio, and an unbalanced current immediately flows to the differential protective relay system. The relay 32 may be made sufficiently quick in operation with the result that the power will be disconnected from the transformer before the fault can do much serious damage to it.

It is customary in current transformers to express their ratios with reference to the secondary and primary currents, while power or distribution transformers have their ratio expressed with reference to voltages. The common bases would be different but for purposes of analyzing the action of my system, I prefer to convert all ratios to a common base, as is known to the art, and this has been done in the preceding description, the reference of the ratios being turns.

It is not at all unusual to employ what is known as a ratio differential relay to take care of slight differences in current transformer ratios which may change with load or heavy external short circuits, so that the relay will not be improperly operated. Moreover, such a ratio relay or current ratio balancing auto-transformer, or both, may be used in the differential protective system for balancing ratios of secondary currents somewhat different than that theoretically required. Practically the latter is employed so that standard current transformers may be utilized in a protective system.

Figure 2:
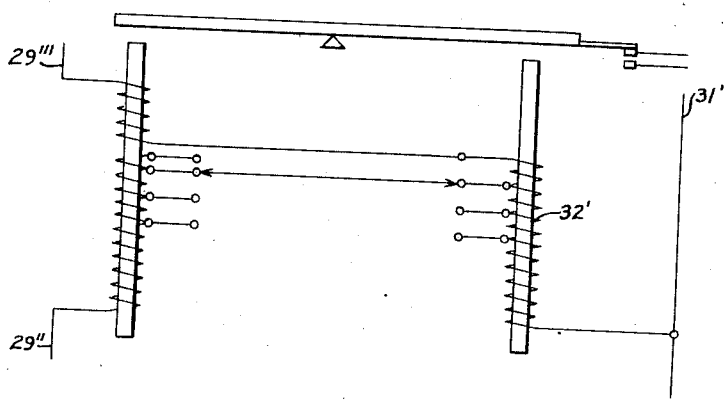
Fig. 2 is a schematic showing of a ratio differential relay commonly used as the operating relay of a differential protective system.

Fig. 2 generally shows a ratio differential relay wherein the coils in the leads 29'' and 29''' are so-called restraining windings, while the coil 32' is the so-called operating winding. By changing the connections to the various taps of this relay the effective ratio of the primary current transformer 27 may be made to balance against the ratios of the secondary side current transformers 20 and 24, as is well known in the art. In the differential protective system, it is only important that the coils 32 or 32' be connected across conductors in a manner to be neutral with balanced incoming and out-going currents in the apparatus being protected.

Figure 3:
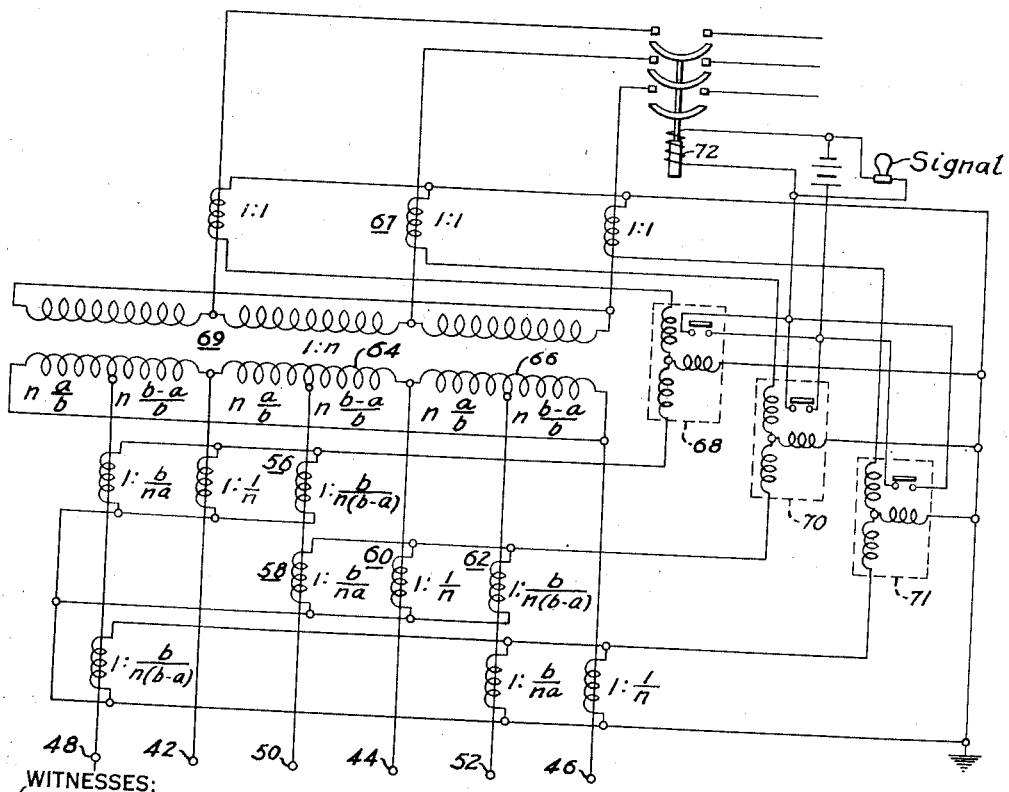
Fig. 3 shows an alternating current machine having delta-connected primary and delta-connected secondary windings with fractional taps from the secondaries. The differential protective system is shown applied to the transformer and it embraces the general principles of my invention.

In Fig. 3, I have shown the general ratios of current transformers for a differential protective system employed in a transformer having delta-connected primary windings and delta-connected secondary windings. It is important to note that in this instance, the main load output leads 42, 44 and 46 each have but a single current transformer, whereas the tapped load feeders 48, 50 and 52 each require two current transformers. In the particular mesh shown, any short across any of the two leads must necessarily have two parallel paths through which to flow, and I have found that because of this, it is essential to have two current transformers in the tap voltage leads.

The secondary of one of these current transformers is connected in parallel with the secondary of the current transformer in an adjacent main load lead, while the other is connected to the secondary of the other adjacent main lead. The ratio of either will depend on the number of turns of the main phase winding between the tap lead and the load lead whose current transformer secondary is in parallel therewith, and is $n$ (the full number of turns in the main phase winding) times unity minus the fraction of turns in the tapped portion.

Thus, for example, for transformer 56, the fraction of turns between leads 42 and 50 compared to those between leads 42 and 44, the main phase, is $$\frac{a}{b}$$

Accordingly, I give the transformer 56 a ratio factor $$1-\frac{a}{b}$$

which is equal to $$\frac{b-a}{b}$$

the actual ratio being $$n\frac{(b-a)}{b}:1$$

However, to illustrate the flexibility by which transformer ratios can be converted as previously explained, I have indicated the ratio of transformer 56 as $$1:\frac{b}{n(b-a)}$$

which is the equivalent of $$n\left(\frac{b-a}{b}\right):1$$

In the same way transformer 58 which has its secondary connected in parallel with the secondary of the transformer 60 in the main lead 44 has the ratio $$n\left(1-\frac{(b-a)}{b}\right):1$$

which is equivalent to $$1:\frac{b}{na}$$

The ratios of the remaining transformers in the tapped leads can be found by proceeding in the same way.

Viewed from a different angle, the ratios of the transformers in the tapped leads may be said to correspond to the ratio of the tap turns when considered from the main load leads adjacent the common lead. For the transformers 58, 60 and 62, the common lead is lead 44 and the adjacent main leads are 42 and 46. The turns between leads 42 and 50 in the secondary winding 64 is $$\frac{na}{b}$$

and this ratio is utilized to determine directly the ratio in the transformer 58. In the same way the turns between the leads 46 and 52 in the secondary 66 of the main transformer is $$n\frac{b-a}{b}$$

which at once determines the ratio of the current transformer 62.

One current transformer only is required in each of the main load leads 42, 44 and 46 and its ratio is that of the main transformer. In this figure, the main transformer ratio has been expressed at 1:$n$. Accordingly, that of each of the current transformers in the main leads is $n:1$ or the equivalent $$1:\frac{1}{n}$$

By a process similar to that described for Fig. 1, it may be shown for Fig. 3 that various external faults involving any of the load leads and ground or combinations thereof will produce no operation of the differential relays 68, 70 and 71.

Inasmuch as one secondary from each of the tap leads is connected in parallel with a secondary of an adjacent main lead, each differential bank will contain three secondary windings in parallel as shown for example by transformers 58, 60 and 62, there being as many banks in this embodiment as there are phases. Each bank connects in series with the secondary of the current transformer of the associated primary lead. Thus, the bank of transformers 58, 60 and 62 is connected to the secondary of the transformer 67 to control the ratio differential relay 68. The total effect for the entire differential protective system is Y connected current transformer secondaries on the primary side of the main transformer 69, each "phase" of which is connected to a bank of current transformers Y connected on the secondary side of the main transformer, with a connection between the neutral points of both Y's. The operating relays 68, 70 and 71 in the corresponding connections between the "phases" of the two Y's, control and circuit breaker 72.

Fig. 4 illustrates the system of Fig. 3 wherein the tap points are in the middle of the secondary windings. Three typical conditions of shorts between various load leads are indicated by the different feathered arrows. The main transformer turn ratio of primary winding to full secondary winding may be any quantity represented by 1:$n$ as in the previous discussion. For simplicity this ratio is assumed to be unity, then the current transformers in the primary leads and the main secondary leads also have a unity ratio, and the current transformers in the half voltage leads have turn ratios 1:2 but current ratios 2:1.

The single feathered arrows represent a short of 6 units between tapped feeders 74 and 75 which will obviously divide in the secondary windings inversely as the impedance between the two parallel paths, that is 4 units through one path and 2 units through the other.

The double feathered arrows represent a short of 4 units between a main feeder 76 and a tapped feeder 74 of a different phase. In this case the parallel paths through the secondaries for these 4 units are equal in impedance and 2 units flow through each as shown.

The triple feathered arrows are representative of a three phase short across the tapped leads 74, 75 and 77, being fed 4 units by lead 74 which divides equally as 2 units flowing back by way of leads 75 and 77.

The arrows and numerals that go with them shown in Fig. 4 are all reference values, and illustrate that external faults do not create unbalanced operating currents in the differential ratio relay.

A practical application of my invention is shown in Fig. 5. In this figure, standard current transformers have been chosen for the different leads based on maximum load currents; the effective operable ratios being balanced in the differential ratio relays of the protective system. The transformers in this embodiment are expressed conventionally, that is, the current transformers ratios 150:5A, 800 to 0.54A, 1600 to 0.5A and 4000:5A represent primary current to secondary current in the current transformers, while the ratios 13200/240/120V represents primary to main secondary and tapped secondary voltages, of the main transformer 80, and 13200/480V represents primary to secondary volts of the main transformer 82. It will be observed that the main power transformer 80 has its primaries parallel to that of the second main power transformer 82. The main transformer 80 has a rating of 300 K. V. A. with 13,200 volts on the primary stepped down to 240 and 120 volts on the secondary, whereas the second transformer 82 has a rating of 2500 K. V. A. with the secondary stepped down to 480 volts.

The respective ratings of the current transformers on the secondary side are theoretically balanced and would require 145–5/11:5 ampere ratio on the primary side for theoretical balance. Standard 150:5 transformers are available for the primary side, and the difference in ratios from the theoretical values can be compensated for by the usual expedients, such as balancing auto-transformers, or, as shown, by ratio differential relays 84, 86 and 88.

My disclosure, therefore, indicates the general principles by which an alternating-current machine having two different simultaneous voltage supplies may be protected against internal faults, and in the specific disclosure, the protection of a transformer, has been described. It is obvious that the terms primary and secondary are interchangeable since it is well known that a transformer is a reversible alternating current machine. Moreover, where I have shown, as for example in Figs. 3, 4 and 5, two separate current transformers on the tapped load leads, it is obvious that a single double secondary current transformer may be substituted having the proper ratios. In the instance where the tap is at half-voltage, the ideal condition is present where the ratios are identical.

While I refer to internal faults on a machine, it is obvious from the inherent character of the differential protective system that such faults as occur anywhere before the current transformers, will operate the differential protective system, and by internal faults I intend to include any faults which occur at any place either within the machine or outside the machine but before the points at which the current transformers are connected.

I have illustrated my invention in the forms which I now believe the best modes of application thereof, but it is obvious that many changes may be made within the spirit and scope of the novel system which I have introduced without deviation from the general principles of my invention.

It is desired, therefore, that the appended claims be given the broadest construction and limited only by the prior art.

I claim as my invention:

1. A network for a multi-phase current comprising an alternating-current machine having a feeder, parallel phases feeding said feeder, said machine having fractional voltage feeder taps in said phases, and differential protective means responsive only to an internal fault in said machine, said protective means comprising transformer means in one of said feeder taps having an effective operable ratio which is substantially a direct function of the ratio of tapped turns to main turns, and in the other unity minus the first said ratio.

2. A transformer for a network comprising a primary and a secondary, said secondary having connections capable of supplying loads of two different voltage supplies simultaneously, and protective means responsive only to an internal fault in said transformer, comprising current transformers in said connections having definite relative ratios dependent largely on the voltage values of said supplies.

3. A transformer for a network comprising a primary and a secondary, said secondary having two different voltage supplies for simultaneously energizable loads, and a differential protective system responsive only to an internal fault in said transformer, said system comprising a transformer means in said tapped supply having an effective operable ratio which is substantially a direct function of the ratio of tapped voltage to main voltage supplies.

4. An electric network having a transformer comprising a primary and connections thereof, and a secondary having a tapped voltage supply and a main voltage supply, a protective relay system for said transformer responsive only to internal faults in said transformer, said relay system comprising a transformer means responsive only to said main secondary supply, a transformer means responsive only to said tapped voltage supply, the two last transformer means operable in parallel and bearing an operable ratio to each other which is substantially a direct function of the ratio of tapped voltage supply to main voltage supply.

5. An electric network having a transformer comprising a primary and connections thereof, and a secondary having a tapped voltage supply and a main voltage supply, a differential protective relay system for said transformer responsive only to internal faults in said transformer, said relay system comprising a current transformer means in said primary, in said main secondary supply, and in said tapped secondary supply, and a system of connections whereby the current transformer means in said main and tapped secondary supplies are in parallel, and both in series with the said current transformer means in said primary.

6. The system of claim 5 in which said transformer means in the tapped secondary supply includes a transformer having a ratio which is substantially a direct function of the ratio of tapped secondary supply and main secondary supply.

7. A multi-phase transformer having main and tapped phase winding load connections operable simultaneously, and means to protect said transformer operable only by internal faults of said transformer, said means including transformer means in said connections connected in parallel.

8. A multi-phase alternating-current machine connected in mesh, and having conductors to loads of two different voltage supplies supplied simultaneously, and protective means operable only by internal faults of said machine, said means including current transformers for each conductor having definite relative ratios dependent largely upon the voltage values of said supplies.

9. An electric network having a multi-phase transformer means comprising primary phase windings and mesh-connected secondary phase windings with a main and a tapped voltage supply for simultaneous application to loads, and protective means operable only by internal faults of said transformer means.

10. An electric network having a multi-phase transformer means comprising primary phase windings and secondary phase windings, a feeder, certain of said secondary windings supplying said feeder in parallel, fractional voltage feeder taps in said last windings, and a differential protective system operable only by internal faults in said transformer means, said protective means comprising current transformer means in said feeder and in said feeder taps connected in parallel and having relative operable ratios corresponding to the ratio of turns of a complete secondary winding to the difference between the turns of a complete secondary winding and the turns from the feeder to the feeder taps.

11. An electric network having a three-phase transformer means comprising primary phase windings and secondary phase windings with three-phase main and tapped secondary supplies operable simultaneously, differential protective means operable only by internal faults of said transformer means, said protective means comprising current transformers in said tapped supply bearing relay operable ratios which substantially correspond to the ratios of tapped supply and main supply multiplied by a parameter.

12. An electric network having a multi-phase transformer including primary phase windings and secondary phase windings, feeders, certain of said feeders, designated as main feeders, being fed from at least two of said secondary windings, tapped feeders from the last said secondary windings, said feeders being capable of simultaneous operation and differential protective means comprising an operating relay, current transformers in feeders to the primary windings, current transformers in said main feeders, current transformers in said tapped feeders, said current transformers having ratios and connections to said relay so as to render said relay operable only by internal faults of said transformer.

13. An electric network having a three-phase transformer means including mesh-connected secondary phase windings having main and tapped voltage supplies, primary phase windings; and differential protective means having an operating relay and current transformers in leads to said primary windings, current transformers in leads of said main and tapped voltage supplies, said current transformers having ratios and connections to said relay so as to render said relay operable only by internal faults of said transformer means.

14. An electric network having a three-phase transformer means including delta-connected primaries and leads therefor and secondaries; said secondaries having a main delta voltage supply and a tapped delta three-phase supply, current transformers for each primary lead, curent transformers for each main secondary supply, and two current transformers for each tapped supply, each primary current transformer being connected in parallel with a current transformer in the two adjacent tapped supplies, such parallel circuit being connected in series to the corresponding primary current transformer, and a differential relay across each of the series leads, said current transformers having ratios so as to render said relay operable only by internal faults of said transformer means.

15. The network of claim 14 including a second transformer means with primaries in parallel with the primaries of the first transformer means, and with secondaries forming a third three-phase supply, a current transformer in each of said last supplies connected in parallel with the said parallel-connected current transformers of the corresponding phase of the first said transformer means, the last said current transformer having a ratio so as to render the relay operable only by internal faults in either of said transformer means.

16. An electric network having a three-phase transformer means including delta-connected primaries and leads therefor, and secondaries; said secondaries having a main delta voltage supply and tapped delta supply of a fraction of the main supply, and differential protective relay means operable only by an internal fault in said transformer comprising a current transformer in each primary lead and each main secondary supply, the current transformer in a primary lead and the current transformer in a secondary supply having a relative relay operable ratio substantially the inverse of the ratio of said transformer means, said relay means also including a pair of current transformers for each of said secondary tapped supplies, a said main secondary current transformer being connected in parallel with two of said current transformers on adjacent tapped supplies, said pair of current transformers bearing relay operable ratios relative to the parallel main supply transformers so that one corresponds substantially to said fraction and the other to unity minus the fraction.

17. A network for multi-phase current comprising an alternating-current machine, having multi-phase windings and taps from said windings, power conductors for each of said phases and taps capable of being concurrently energized, and differential protective means responsive only to an internal fault in said machine, said means including transformers in each of said conductors.

18. An alternating-current machine including a single-phase winding having main voltage conductors and fractional voltage conductors for simultaneously conducting electrical power, and a differential protective system operable only by an internal fault in said winding comprising means interconnecting said main conductor and said fractional voltage conductors to be responsive to the currents in all of said conductors.

EDWARD H. KLEMMER.